US007812989B2

(12) United States Patent
Corona et al.

(10) Patent No.: US 7,812,989 B2
(45) Date of Patent: Oct. 12, 2010

(54) SYSTEM AND METHOD FOR VOICE HELP ON A TOPIC THE USER SELECTS AT THE DEVICE, OR TO CORRECT AN ERROR AT A MULTI-FUNCTION PERIPHERAL (MFP)

(75) Inventors: Fatima Corona, Long Beach, CA (US); Nehal Dantwala, Newport Beach, CA (US)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 1048 days.

(21) Appl. No.: 11/540,283

(22) Filed: Sep. 29, 2006

(65) Prior Publication Data

US 2008/0079981 A1 Apr. 3, 2008

(51) Int. Cl.

| | |
|---|---|
| ***G06F 15/00*** | (2006.01) |
| ***G06F 3/12*** | (2006.01) |
| ***G06K 1/00*** | (2006.01) |

(52) U.S. Cl. .................................... 358/1.15; 358/1.13

(58) Field of Classification Search .................. 358/1.1, 358/1.13, 1.14, 1.15

See application file for complete search history.

(56) References Cited

U.S. PATENT DOCUMENTS

| | | | | |
|---|---|---|---|---|
| 5,127,005 | A | 6/1992 | Oda et al. | |
| 5,583,801 | A | 12/1996 | Croyle et al. | |
| 6,728,343 | B1 | 4/2004 | Taylor et al. | |
| 7,286,954 | B2 * | 10/2007 | Kopelman et al. | 702/152 |
| 7,318,198 | B2 * | 1/2008 | Sakayori et al. | 715/729 |

* cited by examiner

*Primary Examiner*—Douglas Q Tran
(74) *Attorney, Agent, or Firm*—Knobbe Martens Olson & Bear, LLP

(57) ABSTRACT

A method of providing voice help at a multi-function peripheral (MFP) device is disclosed. In one embodiment, the method comprises receiving, at an MFP device, a help request for a task, associated with the use of the MFP device, from a user and providing, at the MFP device, the user with voice help associated with the task. In one embodiment, the task is associated with a topic that the user selects. In another embodiment, the task is associated with correction of an error detected by the MFP device. One embodiment of the invention would provide the user with more "voice" detailed information than with the current technology. Furthermore, a user can easily access and activate complex features of the MFP device via voice help which have not been possible in conventional printing devices.

34 Claims, 5 Drawing Sheets

SYSTEM AND METHOD FOR VOICE HELP ON A TOPIC THE USER SELECTS AT THE DEVICE, OR TO CORRECT AN ERROR AT A MULTI-FUNCTION PERIPHERAL (MFP)

BACKGROUND OF THE INVENTION

1. Field of the Invention

This invention relates to a paper copy output device, and particularly to a system and method for providing a user with voice help at a paper copy output device such as a multi-function peripheral printer.

2. Description of the Related Technology

Recently, multi-function peripheral (MFP) devices (or "all in one" devices), which have multiple functions, have been widely used. Typically, MFP devices can act as a printer, a scanner, a fax machine and a photocopier. These devices are becoming a popular option for small office/home office (SOHO) users because they are less expensive than buying three or four separate devices. MFP devices are also known as multifunction printers.

Most MFP devices can be used as standalone devices for faxing and copying. However, in many situations, they are connected to a computer and/or a network to provide various functions such as color scannings, page printing, scanning and emailing, and additional fax management options.

SUMMARY OF CERTAIN INVENTIVE ASPECTS OF THE INVENTION

One aspect of the invention provides a method of providing voice help at a multi-function peripheral (MFP) device, comprising: receiving, at an MFP device, a help request for a task, associated with the use of the MFP device, from a user and providing, at the MFP device, the user with voice help associated with the task.

Another aspect of the invention provides a method of providing voice help at a multi-function peripheral (MFP) device, comprising: i) detecting an error at an MFP device, ii) receiving, at the MFP, a help request to correct the detected error from a user and iii) providing, at the MFP device, the user with voice help to correct the detected error.

Another aspect of the invention provides a method of providing voice help at a multi-function peripheral (MFP) device, comprising: i) providing, at an MFP device, a user with a plurality of topics associated with the use of the MFP device, ii) receiving, at the MFP device, a help request for one of the plurality of topics from the user and iii) providing, at the MFP device, the user with voice help for the selected topic.

Still another aspect of the invention provides a multi-function peripheral (MFP) device, comprising: i) an interface configured to receive a help request for a task, associated with the use of the MFP device, from a user, ii) a memory configured to store a plurality of voice help files, iii) a controller, being in data communication with the memory, configured to provide the user with voice help associated with the requested task and iv) a speaker configured to output voice signals indicative of the voice help.

Still another aspect of the invention provides a multi-function peripheral (MFP) device, comprising: i) an interface configured to receive a help request for a task, associated with the use of the MFP device, from a user, ii) a memory configured to store text files associated with a plurality of voice help procedures, iii) a controller, being in data communication with the memory, configured to retrieve a text file associated with the requested task, iv) a converter configured to convert the retrieved text file to voice signals and v) a speaker configured to output the voice signals.

Still another aspect of the invention provides one or more processor readable storage devices having processor readable code embodied on the processor readable storage devices, the processor readable code for programming one or more processors to perform a method of providing voice help at a multi-function peripheral (MFP) device, the method comprising: receiving, at an MFP device, a help request for a task, associated with the use of the MFP device, from a user and providing, at the MFP device, the user with voice help associated with the task.

Yet another aspect of the invention provides a system for providing voice help at a multi-function peripheral (MFP) device, comprising: means for receiving, at an MFP device, a help request for a task, associated with the use of the MFP device, from a user and means for providing, at the MFP device, the user with voice help associated with the task.

Yet another aspect of the invention provides a method of providing voice help at a paper copy output device, comprising: receiving, at a paper copy output device, a help request for a task, associated with the use of the paper copy output device, from a user and providing, at the paper copy output device, the user with voice help associated with the requested task.

BRIEF DESCRIPTION OF THE DRAWINGS

Embodiments of the invention will be described in conjunction with the following drawings, in which like reference numerals indicate identical or functionally similar elements.

DETAILED DESCRIPTION OF CERTAIN EMBODIMENTS OF THE INVENTION

In handling printing problems, current printing devices generally provide a user with help in the form of text displayed on a screen of the device. Some printing devices read and inform the user of the type of an error by way of voice, but does not walk the user through the steps to resolve the problems. In addition, current technology in voice help is made part of a printer driver and is only provided at user's request at their PC's, not the device.

U.S. Pat. No. 5,583,801 discloses providing voice help at a sewing machine. U.S. Pat. No. 6,728,343 discloses providing voice help at a telephone or kitchen devices. U.S. Pat. No. 5,127,005 discloses diagnosis and problem shooting at a copying machine via a display without the use of voice help. However, no paper copy output devices, including multi-function peripheral (MFP) devices, which can provide voice help, have been developed. Furthermore, MFP devices generally include complex workflow features or detailed electronic manuals therein. However, to use these features, there would need to be additional steps where a customer usually has difficulty in browsing through a front panel and know how to use the features.

One aspect of the invention is a method and system for providing, at a paper copy output device, a user with voice help with respect to the use of the device. Another aspect of the invention is a method and system for providing, at a paper copy output device, a user with voice help for topics selected by the user or errors detected by the device. Still another aspect of the invention provides a user with the option to obtain voice help from their printing devices.

Figure 1:
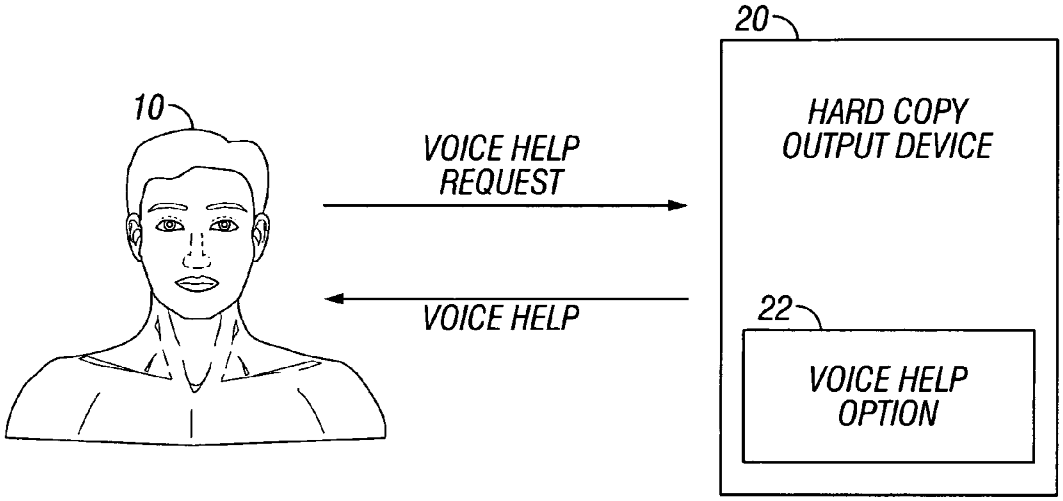
FIG. 1 illustrates a conceptual diagram of a system for providing, at a paper copy output device, a user with voice help according to one embodiment of the invention.

FIG. 1 illustrates a conceptual diagram of a system for providing, at a paper copy output device, a user with voice help according to one embodiment of the invention. Referring to FIG. 1, a user 10 requests that a paper copy output device 20 provide voice help with respect to the use of the device 20. In one embodiment, the voice help request is associated with certain topics or errors detected by the device 20 (will be described in greater detail later). In reply to the request, the device 20 provides the user 10 with voice help via, for example, a speaker (not shown). In one embodiment, the paper copy output device 20 includes a voice help option 22 which asks the user 10 to select the option 22 to enable the voice help function. In another embodiment, upon detection of errors, the device 20 may provide voice help without asking the user to enable the voice help function 22. In one embodiment, the device 20 stores voice help files in a memory (not shown) thereof.

In one embodiment, the device 20 may visually demonstrate the messages that are provided as the voice help on a display screen of the device 20 in addition to the voice messages. In this embodiment, the visual demonstration can be provided concurrently with or subsequent to the voice messages. This function would be beneficial, particularly for users who are not familiar with a certain component or have hearing disabilities. The above features described with respect to FIG. 1 may apply to the remaining embodiments.

In one embodiment, the paper copy output device 20 includes, by way of example, an MFP device (either color or monochrome MFP printer), a scanner device, a fax machine, a printer, a copier and an all-in-one device.

In another embodiment, the device 20 may include other paper copy output devices which have been developed or may be developed in the future. The device 20 can be connected to a PC via a USB connection or connected to a network via, for example, an Ethernet connection. In another embodiment, the device 20 does not require to be connected to a PC.

Figure 2:
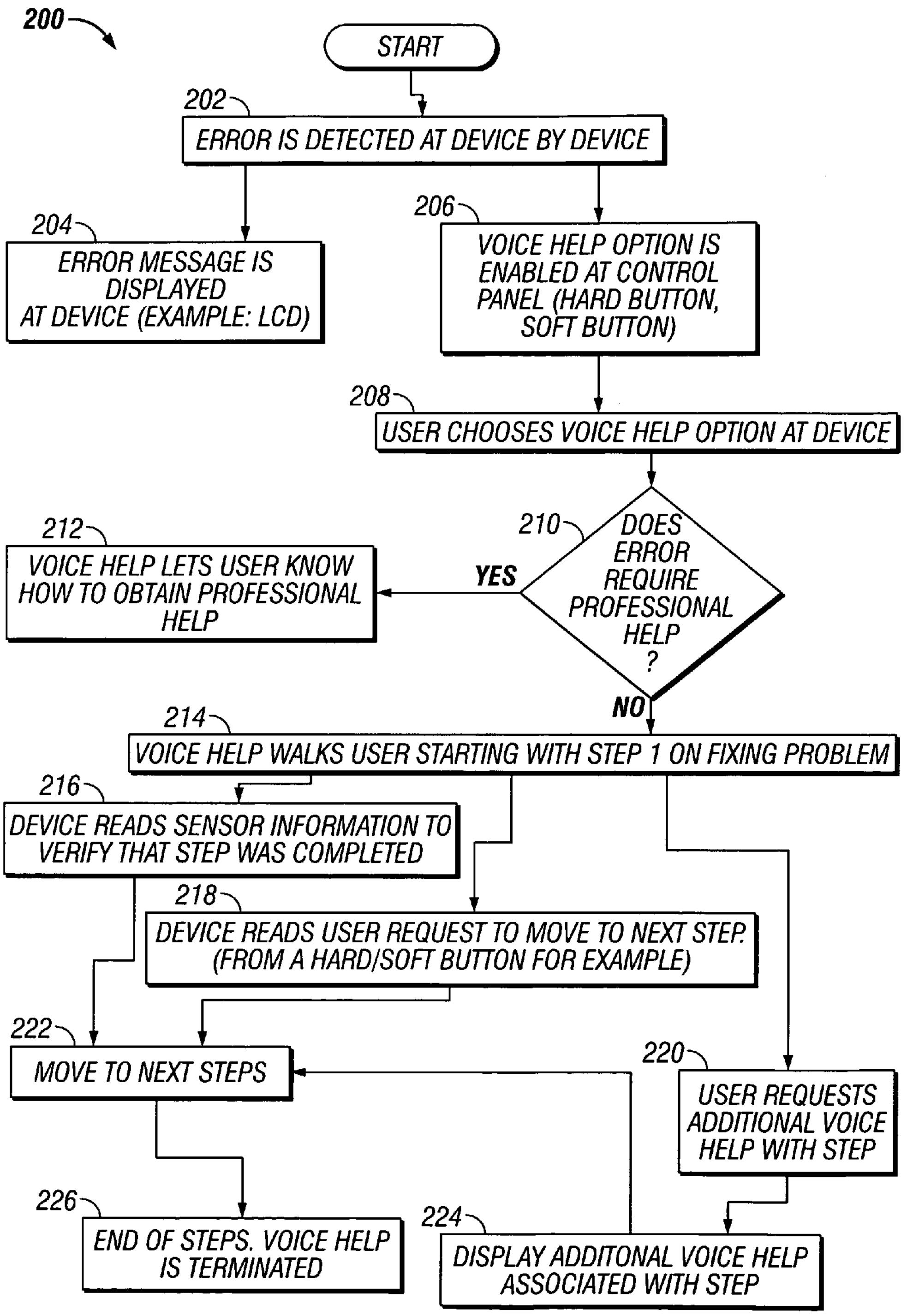
FIG. 2 illustrates an exemplary flowchart of a procedure for providing, at a paper copy output device, a user with voice help for errors detected by the paper copy output device according to one embodiment of the invention.
Figure 3:
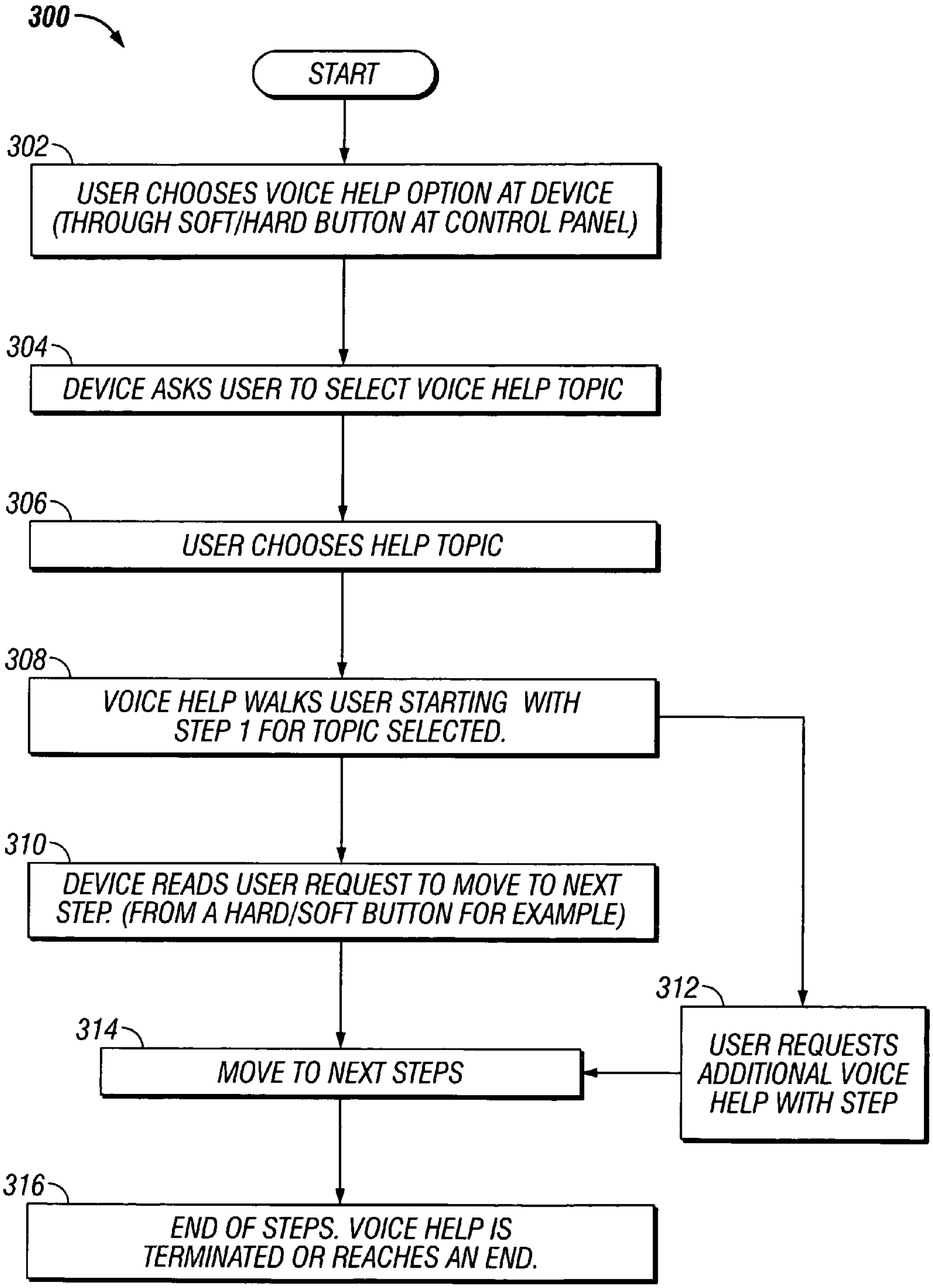
FIG. 3 illustrates an exemplary flowchart of a procedure for providing, at a paper copy output device, a user with voice help for topics selected by the user according to another embodiment of the invention.

FIG. 2 illustrates an exemplary flowchart of a procedure 200 for providing, at a paper copy output device, a user with voice help for errors detected by the paper copy output device according to one embodiment of the invention. FIG. 3 illustrates an exemplary flowchart of a procedure 300 for providing, at a paper copy output device, a user with voice help for topics selected by the user according to another embodiment of the invention. In the procedures 200 and 300, depending on circumstances, additional states may be added, others removed, or the order of the states changes. Furthermore, more than two states can be combined into one state.

Referring to FIG. 2, the procedure 200 will be described. In state 202, an error is detected at the device 20 by the device 20 itself. The error detection may be performed by an existing sensor of the device 20. The error my include, by way of example, a paper jam, open tray or out of toner. In one embodiment, an error message is displayed through the device's error notification mechanism, for example, LED or LCD on the control panel of the device 20 (204). In another embodiment, the error message may be provided to the user 10 via a voice message.

Figure 4:
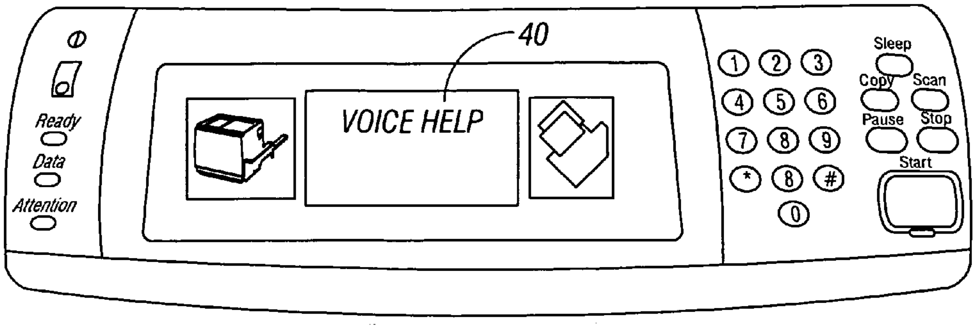
FIG. 4 illustrates a soft button of a paper copy output device for enabling the voice help function according to one embodiment of the invention.
Figure 5:
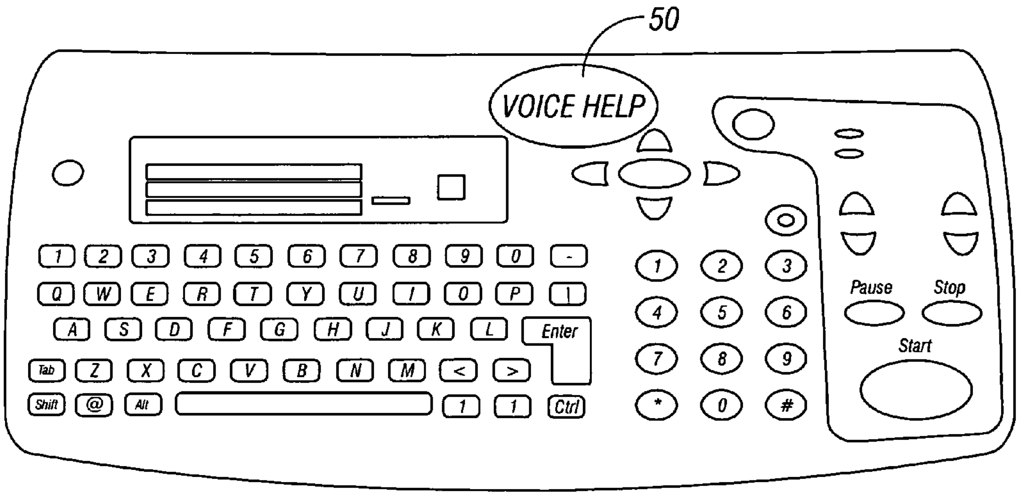
FIG. 5 illustrates a hard (physical) button of a paper copy output device for enabling the voice help function according to another embodiment of the invention.

The voice help option 22 is enabled (or provided) at the control panel (206). In one embodiment, the voice help option 22 is enabled through the use of a soft button 40 (touch screen) as shown in FIG. 4. In another embodiment, the option 22 is enabled by way of a hard button 50 (physical button) as shown in FIG. 5. In still another embodiment, the option 22 may be enabled via a menu option (not shown) on the control panel of the device 20. In state 208, the user 10 selects the voice help option 22 at the device 20.

It is determined whether the detected error requires professional help or service (210). In one embodiment, the device 20 performs the state 210 based on an error code, which is stored in the device 20, corresponding to the detected error. For example, the device 20 automatically determines that the error requires professional help or service if the code for the detected error belongs to the group of predetermined error codes. If the error requires service, the device 20 informs the user 10 of how to receive professional help (212) by, for example, voice or display.

The device 20, based on stored voice help files, helps the user 10 with fixing problems from the beginning (step 1) (214). In one embodiment, the following voice messages can be provided via a speaker of the device 20: "A paper is jammed. Please open the cover No. 1 of the device. Please first release a green lever and then, remove the jammed paper . . . ."

In one embodiment, the device 20 can detect if a step has been completed by way of sensors provided on the device 20 (216). In another embodiment, particularly in a case where a certain action is not associated with a sensor, the user 10 is given the option to proceed to the next action through the use of a "next" button, for example (218). In one embodiment, certain actions, associated with a sensor, are combined with those actions, associated with no sensor. In this embodiment, the state 216 for both types of actions associated with and without sensors can be simultaneously performed based on the sensor associated actions.

If the user 10 does not understand the given voice help or the voice help is not sufficient to complete a step, the device 20 can give the user 10 an option to obtain more voice information for that step (220, 224). The user 10 is moved to the next steps (222). Thereafter, the user 10 is walked through all the steps necessary to bring the device 20 to a stable state, when voice help is terminated (226).

In one embodiment, the user 10 is given the option to turn off the voice help function at any time during the procedure 200. In one embodiment, the user 10 is given the option of repeating the voice help instruction that has been previously provided. This can be done through the use of a soft/hard button on the control panel, for example. These features also apply to the procedure (300) shown in FIG. 3.

Referring to FIG. 3, the procedure 300 will be described. In this embodiment, the user 10 can request more general voice help from the device 20 on a topic of interest. In one embodiment, the topic may include, by way of example, paper jam, open tray and out of toner. In another embodiment, the topic may include embedded complex features and/or at least part of an electronic manual of the device 20. According to this embodiment, the user 10 can easily access and activate the complex features via voice help which have not been possible in conventional paper copy output devices. In addition, the productivity of the device 20 and efficiency of the user 10 can be enhanced since the user 10 is walked through the exact steps. Voice help will also allow for short cuts that were not possible before. For example, a new feature requires multiple steps and requires creation of the same number of new screens. With voice help, the user 10 can reuse the original screens.

In state 302, the user selects the voice help option at the device 20. In one embodiment, the selection can be accomplished through a soft/hard button, or by navigating through the device's internal menu to find a voice help option. The device 20 asks the user 10 to select help topics through the options provided by the device 20 (304), and the user 10 chooses a help topic that he wants (306). The device 20, based on stored voice help topic files, walks the user 10 through procedures associated with the selected topic. The states 312-316 are substantially the same as the states 220, 222 and 226 of FIG. 2, respectively. Thus, the description thereof will be omitted.

In one embodiment, each of the voice help procedures 200 and 300 illustrated in FIGS. 2 and 3 is implemented in a conventional programming language, such as C or C++ or another suitable programming language. In one embodiment of the invention, the program is stored on a computer accessible storage medium of the hard copy output device 20. In another embodiment, the program can be stored in other system locations so long as it can perform the voice help procedures 200 and 300 according to embodiments of the invention. In this embodiment, the program may be stored in a server computer and downloaded to the paper copy output device 20. The storage medium may comprise any of a variety of technologies for storing information. In one embodiment, the storage medium comprises a random access memory (RAM), hard disks, floppy disks, digital video devices, compact discs, video discs, and/or other optical storage mediums, etc.

In another embodiment, the paper copy output device 20 comprises a processor (not shown) configured to or programmed to perform the inventive voice help procedures 200 and 300. The program may be stored in the processor or a memory of the device 20. In various embodiments, the processor may have a configuration based on Intel Corporation's family of microprocessors, such as the Pentium family and Microsoft Corporation's windows operating systems such as Windows 95, Windows 98, Windows 2000 or Windows NT. In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 2000/9x/ME/XP, Macintosh OS, OS/2 and the like. In another embodiment, the voice help procedures 200 and 300 can be implemented with embedded software.

Figure 6:
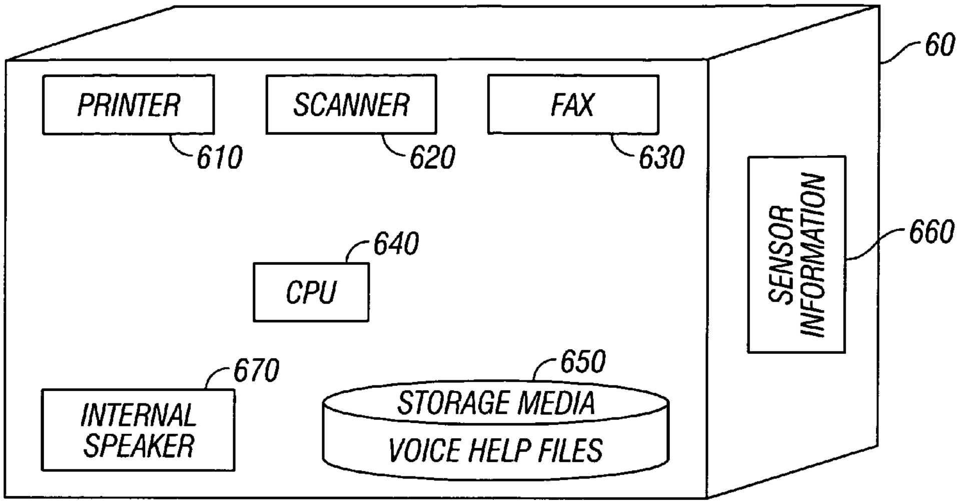
FIG. 6 illustrates an exemplary block diagram of a multi-function peripheral (MFP) device according to one embodiment of the invention.
Figure 7:
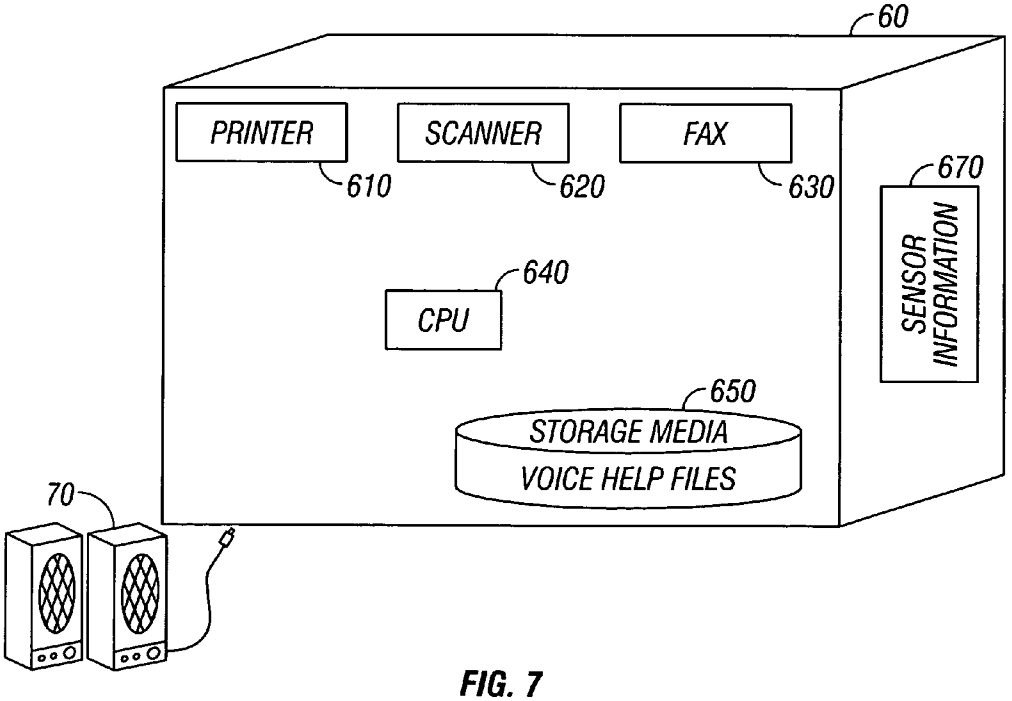
FIG. 7 illustrates an exemplary block diagram of a multi-function peripheral (MFP) device according to another embodiment of the invention.

FIG. 6 illustrates an exemplary block diagram of an MFP device 60 according to one embodiment of the invention. FIG. 7 illustrates an exemplary block diagram of the MFP device 60 according to another embodiment of the invention. In one embodiment, the MFP device 60 is in data communication with a computing device (e.g., PC) and/or another MFP device (not shown) with the use of either a known (public) communication protocol, for example, TCP/IP, or a proprietary communication protocol. In one embodiment, the MFP device 60 includes an SCX-6320F available from Samsung Electronics. In one embodiment, the MFP device 60 may include all competitive products, in addition to in-house developed printers and any MFP printers.

Referring to FIGS. 6 and 7, the MFP device includes a printer 610, a scanner 620, a fax 630, a CPU 640 and a storage media 650. The storage media 650 stores voice help files for performing the procedures 200 and 300 of FIGS. 2 and 3. In one embodiment, The storage media 650 stores pre-recorded audio files associated with the voice help procedures. The language of the voice help files used in the device 60 may depend on the language chosen for the control panel during installation/configuration.

The MFP device 60 may have the ability to read sensor information 660 and dynamically choose appropriate voice help files. The CPU 640, being in data communication with the storage media 650, provides the user 10 with voice help for selected topics or detected errors via an embedded internal speaker 670 (FIG. 6) or an external speaker 70 connected to the MFP 60 (FIG. 7). The CPU 640 may read sensor information 660 for a detected error or to determine whether the error has been resolved as described with respect to FIG. 2.

In another embodiment, the storage media 650 stores XML based files which can dynamically be converted into voice commands via a known converter when the "voice help" feature is chosen by the user at the control panel. One known technology that could be used is VoiceXML. VoiceXML is an XML language for writing Web pages which the user 10 interacts with by listening to spoken prompts, and controlled by means of spoken input. In one embodiment, the storage media 650 includes XML based text files, wherein the MFP device 60 includes a converter (not shown) which converts the XML based text files to audio signals. In one embodiment, the storage media 650 can incorporate the converter function therein.

In another embodiment, the MFP device 60 uses Text to Speech (TTS) or Speech Synthesis technology. In this embodiment, the storage media 650 includes text files, wherein the MFP device 60 includes a converter (not shown) which converts the text files to voice signals. There are commercial tools available to perform this conversion. Using TTS, the files that are saved on the device 60 will be the same. If voice help is activated, instead of displaying all the information on the screen, it will be converted to voice signals.

At least one embodiment of the invention would provide the user with more "voice" detailed information than with the current technology, where information is limited, and in many times vague. Voice help would allow for more information to be given to a user in an event of a device error/failure or at user request. It would not be limited to screen space on the control panel. Also, it would guide the user step by step in resolving the issue. In addition, the help is provided at the printing device itself, not an external PC. This helps the user in solving the device's error/failure in a timely manner without having to walk back and forth from their desk to the device, especially in cases where the device is shared by a group of people. In addition, having the help on the printing device, and the fact that it is a "voice" help may accommodate individuals with disabilities.

One embodiment of the invention provides the following benefit particularly for people with disabilities in connection with "Provisions for Rehabilitation Act Section 508." As described below, at least one embodiment of the invention meets the associated guidelines of the Section for "Self-contained, closed products (1194.25)" in connection with printer/ copier/MFP devices or other paper copy output devices. The labels (a)-(j) below correspond to the paragraphs ((a)-(j)) of the above-indicated Section (1194.25).

(a) Today help menus are only shown on a screen. According to at least one embodiment of the invention, an auditory output will be available. This output can be heard with or without headsets.

(b) While providing auditory help, sufficient time will be given between steps to follow through.

(c) The button to activate the voice help will have the following characteristics to meet with part (c) of the standard (1194.25).

(1) It will be tactilely discernible. There will be unique marks on the button.

(2) Button shall be operable with one hand.

(3) Repeat pressing of the button might not be needed, but if needed, the delay will be adjustable to 2 seconds.

(4) The status of the button shall be discernible via voice.

(e) The audio output levels shall comply with the standard. It will be available for private listening through standard connector. There will be provisions to interrupt, pause and restart the audio at any time.

(f) The audio output levels will comply with part (f) of the standard (1194.25).

(j) Buttons to activate voice help shall be located as per part (j) of the standard (1194.25).

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of providing voice help at a multi-function peripheral (MFP) device, comprising:

receiving, at an MFP device, a help request for a task, associated with the use of the MFP device, from a user; and providing, at the MFP device, the user with voice help associated with the task, wherein the task is associated with correction of an error detected by the MFP device, and wherein the method further comprises determining whether the detected error requires professional assistance, before the providing, based on an error code that is stored in the MFP device.

2. The method of claim 1, wherein the task is associated with a topic that the user selects.

3. The method of claim 2, further comprising providing a plurality of voice help topics for the user to select therefrom.

4. The method of claim 1, further comprising automatically determining, at the MFP device, that the detected error requires professional assistance if the code for the detected error belongs to a group of predetermined codes stored in the MFP device.

5. The method of claim 1, further comprising displaying text indicative of the voice help.

6. A method of providing voice help at a multi-function peripheral (MFP) device, comprising:

detecting an error at an MFP device;

receiving, at the MFP, a help request to correct the detected error from a user; and providing, at the MFP device, the user with voice help to correct the detected error wherein the method further comprises determining whether the detected error requires professional assistance, before the providing, based on an error code that is stored in the MFP device.

7. The method of claim 6, further comprising providing the user with an option to request voice help.

8. The method of claim 6, further comprising automatically determining, at the MFP device, that the detected error requires professional assistance if the code for the detected error belongs to a group of predetermined codes stored in the MFP device.

9. The method of claim 6, further comprising providing additional voice help which further explains the previously provided voice help.

10. The method of claim 6, wherein the voice help includes a plurality of help steps.

11. The method of claim 10, further comprising determining whether a given step has been completed based on a sensor of the MFP device.

12. A method of providing voice help at a multi-function peripheral (MFP) device, comprising:

providing, at an MFP device, a user with a plurality of topics associated with the use of the MFP device;

receiving, at the MFP device, a help request for one of the plurality of topics from the user; and providing, at the MFP device, the user with voice help for the selected topic, wherein at least one of the plurality of topics is associated with trouble shooting for the MFP device, and wherein the method further comprises determining whether the trouble shooting requires professional assistance, before the providing, based on an error code that is stored in the MFP device.

13. The method of claim 12, further comprising automatically determining, at the MFP device, that the trouble shooting requires professional assistance if the code for the detected error belongs to a group of predetermined codes stored in the MFP device.

14. The method of claim 12, wherein at least one of the plurality of topics includes at least part of an electronic manual of the MFP device.

15. The method of claim 12, further comprising providing the user with an option to repeat the previously given voice help.

16. The method of claim 12, further comprising providing the user with an option to disable the voice help.

17. A multi-function peripheral (MFP) device, comprising:

an interface configured to receive a help request for a task, associated with the use of the MFP device, from a user;

a memory configured to store a plurality of voice help files;

a controller, being in data communication with the memory, configured to provide the user with voice help associated with the requested task, wherein the task is associated with correction of an error detected by the MFP device, and wherein the controller is further configured to determine whether the detected error requires professional assistance based on an error code that is stored in the memory; and a speaker configured to output voice signals indicative of the voice help.

18. The device of claim 17, wherein the speaker is a built-in speaker.

19. The device of claim 17, wherein the speaker is an external speaker connected to the MFP device.

20. The device of claim 17, wherein the interface is a control panel of the MFP device.

21. The device of claim 20, wherein the control panel is configured to provide the user with an option to request voice help.

22. The device of claim 21, wherein the control panel includes a display screen having a soft button with which the user can enable voice help.

23. The device of claim 21, wherein the control panel includes a physical button with which the user can enable voice help.

24. A multi-function peripheral (MFP) device, comprising:

an interface configured to receive a help request for a task, associated with the use of the MFP device, from a user;

a memory configured to store text files associated with a plurality of voice help procedures;

a controller, being in data communication with the memory, configured to retrieve a text file associated with the requested task, wherein the task is associated with correction of an error detected by the MFP device, and wherein the controller is further configured to determine whether the detected error requires professional assistance based on an error code that is stored in the memory;

a converter configured to convert the retrieved text file to voice signals; and a speaker configured to output the voice signals.

25. The device of claim 24, wherein the text files are XML based files.

26. The device of claim 24, wherein the memory incorporates the converter.

27. One or more processor-readable storage devices having processor-readable code embodied on the processor-readable storage devices, the processor-readable code for programming one or more processors configured to perform a method of providing voice help at a multi-function peripheral (MFP) device, the method comprising:

receiving, at an MFP device, a help request for a task, associated with the use of the MFP device, from a user; and providing, at the MFP device, the user with voice help associated with the task, wherein the task is associated with correction of an error detected by the MFP device, and wherein the method further comprises determining whether the detected error requires professional assistance before the providing based on an error code that is stored in the MFP device.

28. A system for providing voice help at a multi-function peripheral (MFP) device, comprising:

means for receiving, at an MFP device, a help request for a task, associated with the use of the MFP device, from a user; and means for providing, at the MFP device, the user with voice help associated with the task, wherein the task is associated with correction of an error detected by the MFP device, and wherein the system further comprises means for determining whether the detected error requires professional assistance based on an error code that is stored in the MFP device.

29. A method of providing voice help at a paper copy output device, comprising:

receiving, at a paper copy output device, a help request for a task, associated with the use of the paper copy output device, from a user; and providing, at the paper copy output device, the user with voice help associated with the requested task, wherein the task is associated with correction of an error detected by the paper copy output device, and wherein the method further comprises determining whether the detected error requires professional assistance before the providing based on an error code that is stored in the paper copy output device.

30. The method of claim 29, wherein the task is associated with a topic that the user selects.

31. The method of claim 29, further comprising automatically determining, at the paper copy output device, that the detected error requires professional assistance if the code for the detected error belongs to a group of predetermined codes stored in the paper copy output device.

32. The method of claim 29, wherein the paper copy output device is one of the following: a multi-function peripheral (MFP) device, a fax machine, a printer, a copier, a scanner and an all-in-one device.

33. The method of claim 1, wherein the MFP device is configured to communicate data with at least one of a computing device and another MFP device with the use of a communication protocol.

34. The device of claim 17, wherein the MFP device is configured to communicate data with at least one of a computing device and another MFP device with the use of a communication protocol.

* * * * *